United States Patent [19]

Stebbins et al.

[11] 3,722,687
[45] Mar. 27, 1973

[54] FLOATING OIL SKIMMING APPARATUS WITH OIL AND WATER SEPARATOR

[75] Inventors: George B. Stebbins, Santa Ana; James F. Stebbins, San Marino; John G. Becker, Long Beach, all of Calif.

[73] Assignee: Edessa H. Rose, San Marino, Calif.; by said John G. Becker

[22] Filed: Dec. 28, 1970

[21] Appl. No.: 101,644

[52] U.S. Cl............210/219, 210/DIG. 21, 210/221, 261/28
[51] Int. Cl. ..................................B01d 19/00
[58] Field of Search....210/83, 65, 71, 416, 162, 242, 210/DIG. 21, 221, 150, 151, 169, 219; 55/171–175; 261/28

[56] References Cited

UNITED STATES PATENTS

| 2,330,508 | 9/1943 | McColl | 210/242 |
|---|---|---|---|
| 1,920,371 | 8/1933 | Franke | 210/242 X |
| 2,891,672 | 6/1959 | Veld et al. | 210/242 |
| 3,219,190 | 11/1965 | Thune | 210/242 |
| 3,348,690 | 10/1967 | Cornelissen | 210/242 |
| 3,418,236 | 12/1968 | Mall | 210/221 |
| 1,055,082 | 3/1913 | Rogers | 210/169 |
| 3,489,095 | 1/1970 | Eheim | 210/169 |
| 3,547,553 | 12/1970 | Stanfield | 415/7 |
| 3,598,501 | 8/1971 | Stanfield | 415/7 |

Primary Examiner—Reuben Friedman
Assistant Examiner—T. A. Granger
Attorney—Nilsson, Robbins, Wills & Berliner

[57] ABSTRACT

A floating platform, vertically adjustable relative to the surface of the water and an oil slick floating thereon, having a weir member at the outer periphery and a sump and centrifugal pump adjacent the center thereof, and an oil-water separator for receiving an aerated oil and water mixture from the pump and cascading it over vertically spaced pan-like separators for causing the air and oil in the mixture to float to the surface of the separator, and water to flow to the bottom.

12 Claims, 6 Drawing Figures

INVENTORS
JAMES F. STEBBINS
GEORGE B. STEBBINS
JOHN G. BECKER
BY:
NILSSON ROBBINS WILLS & BERLINER
ATTORNEYS.

FLOATING OIL SKIMMING APPARATUS WITH OIL AND WATER SEPARATOR

BACKGROUND OF THE INVENTION

The present invention relates generally to the fluid separation art, and more particularly to a novel floating oil skimming apparatus with an associated oil and water separator.

In recent years, the problems of preventing oil spills in coastal and inland waters and the recovery of such oil which has been spilled, has become acute. This is a particularly pressing problem in offshore drilling areas where spills occur from producing wells, and in harbor areas where ships flush out fuel tanks prior to refilling. There is also a considerable spillage into water ponds in shore drilling fields, which contributes to air pollution and also causes injury to water fowl and other wildlife which come in physical contact with it.

During recent large oil spills in coastal waters, hundreds of workers and numerous small craft were employed at considerable expense to spread straw over oil slicks floating on the water and onto oil which had been washed up on the beach areas, in an effort to absorb the oil from the water and the sand. Further time, money and effort was then expended to dispose of the oil-soaked straw. At other oil spills in the ocean, crude boom barriers and suction pumps have been employed in a relatively unsuccessful effort to confine the oil slick and remove the oil from the water.

SUMMARY OF THE INVENTION

With the foregoing limitations and deficiencies of the presently known apparatus and methods in mind, it is an object of the present invention to provide a novel floating oil skimming apparatus which continuously removes a floating oil and water mixture from the surface of a body of water such as a pond or ocean, and conditions the mixture for ready separation, and an oil-water separator for receiving the conditioned mixture and continuously and automatically separating the oil from the water.

A further object is to provide a novel floating oil skimming apparatus which continuously removes an oil and water mixture from the surfaces of ponds and from harbor and coastal waters, which conditions the mixture for the efficient separation of the oil from the water, and which discharges the mixture to an oil-water separator.

Another object is to provide such a novel oil skimming apparatus which include means for aerating the oil and water mixture, to thereby facilitate the separation of the oil from the water.

Yet another object is to provide a novel oil skimming apparatus as referred to above, which includes means for compensating for differences in the thickness of depth of an oil slick floating on the water surface. More particularly, it is an object to provide such an oil skimming apparatus which includes means for varying the position of the upper surface of the skimming apparatus relative to the lower surface of the floating oil slick.

A further object is to provide a novel oil and water separator for continuously separating the oil from the conditioned oil and water mixture received from the aforesaid oil skimming apparatus. More particularly, it is an object to provide a separator for continuously separating oil from an aerated oil-water mixture, and for delivering the separated oil to a storage container.

We have discovered that the aforesaid objects are fulfilled by a platform which is adapted to float on a body of water and having an oil and water mixture (slick) on the surface thereof, and which includes a flat upper surface and an upstanding peripheral weir at the outer edge thereof, whereby the oil and water mixture flows over the weir and toward the center of the floating platform; a sump adjacent the center of the platform surrounded by a second weir; and a centrifugal pump positioned in the sump to receive the oil and water mixture and aerate the same, and to transfer the aerated oil-mixture to the top of a separating tank in which the mixture flows downwardly over vertically spaced pans whereby the oil and air float to the top and are removed from the tank, and the water flows to the bottom of the tank from where it is continuously removed. The floating platform has negative buoyancy, and adjustable floats are provided outboard of the platform to vary the position of the top of the peripheral weir relative to the bottom of the oil slick. Water jet means may also be provided outboard of the platform to cause the oil slick to flow toward the floating platform.

DESCRIPTION OF THE PREFERRED EMBODIMENT

Figure 2:
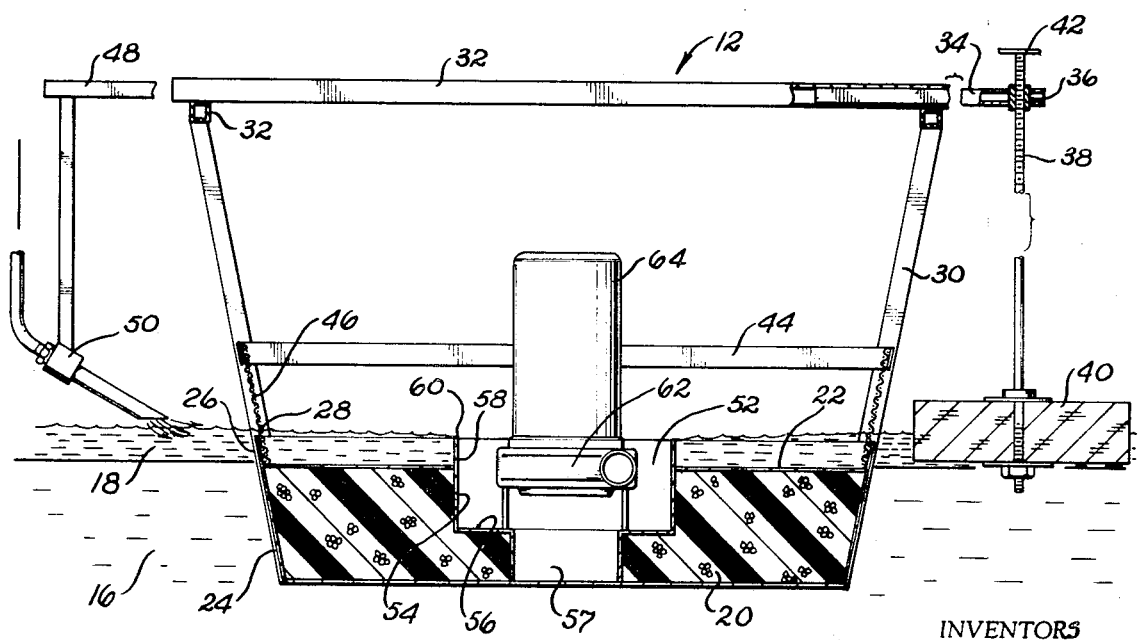
FIG. 2 is an enlarged vertical sectional view of the oil skimming apparatus, taken on the line 2—2 in FIG. 1, with the addition of one water jet.

Referring to the drawings more particularly by reference numerals, the number 10 indicates generally the combination of the floating oil skimming apparatus and oil and water separator constructed in accordance with the teachings of the present invention, including an oil skimming apparatus 12 and an oil-water separator 14, the skimming apparatus being shown floating on a body of water water 16 having a layer of water and oil mixture 18 (FIG. 2) floating on the upper surface thereof, said oil and water mixture being referring to hereinafter as an oil slick.

The skimming apparatus 12 comprises a floating platform 20 of solidified polyurathene foam or similar material which provides a slight negative buoyancy. The platform could be made of a non-floating material, but this would increase the size of the float members referred to below.

The platform includes a flat upper surface 22, and for convenience of construction is preferably of square configuration with four outer side walls 24 which extend downwardly and inwardly. In engagement with the side walls are four outer weir panels 26 which have upper edges 28 projecting a predetermined distance above the upper surface 22 of the platform.

The framework of the skimming apparatus includes an angle-iron upright 30 fastened to the weir panels 36 at each corner of the platform, and horizontally extending tubular bars 32 fastened to the upper ends of the uprights 30, each bar 32 having a cantilever portion 34 which extends laterally beyond the uprights 30.

Adjacent the outer end of each cantilever portion 34 is an internally threaded sleeve 36 which receives the upper end of a threaded adjusting rod 38, the lower end of each rod being provided with a float member 40. A handle 42 is provided at the upper end of each adjusting rod 38, for varying the vertical position of the floats 40 relative to the upper surface of the platform 20, whereby the upper edges 28 of the outer weir panels 26 can be adjusted relative to the bottom surface of the oil slick 18, for a purpose to appear.

Fastened adjacent the centers of the uprights 30 and extending transversely therebetween are supporting straps 44 (FIG. 2), each of which supports the upper edge of a section of screening 46, the bottom edge of the screening being fastened to the inside surface of the upper portion of each outer weir panel 26. The screens 46 prevent trash and debris (not shown) in the oil slick from floating over the outer weir panels 26 and onto the upper surface 22 of the floating platform 20.

If desired, additional outriggers 48 (FIG. 2) can be supported on the framework, such outriggers supporting nozzles 50 for directing a stream of water under pressure inwardly toward the floating platform 20 to move the oil slick 18 toward the platform and over the outer weir panels 26.

Adjacent the center of the floating platform 20 (FIG. 2) is a sump 52 with an annular side wall 54 and a bottom wall 56, and a recessed vortex chamber 57. An annular inner weir panel 58 with an upper edge 60 is in engagement with the side wall 54, the upper edge 60 being substantially in horizontal alignment with the upper edges 28 of the outer weir panels 26.

A centrifugal pump 62 (FIG. 2) which is driven by motor means 64 is supported by legs 66 which bear upon the bottom wall 56, the pump being positioned directly above the vortex chamber 56.

Figure 3:
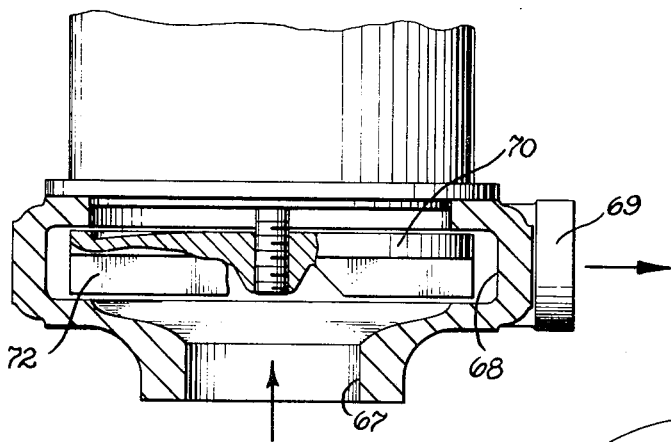
FIG. 3 is a fragmentary, enlarged, vertical sectional view of the pump impeller and housing which is shown in elevational view in FIG. 2.
Figure 4:
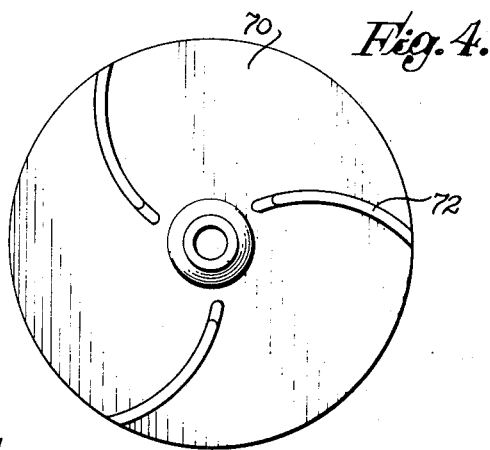
FIG. 4 is a bottom plan view of the pump impeller, as viewed from below FIG. 3.

As shown in FIGS. 3 and 4, the pump 62 has an axially extending bottom inlet 67 which is in communication with a centrifugal volute impeller chamber 68, and an outlet 69 from the chamber. Positioned in the impeller chamber 68 is a semi-open, non-clog impeller 70 with three depending arcuate vanes or blades 72. To our knowledge, this type of an impeller has not been used with this type of pump housing, without a built-in primer tank, nor has this type of pump housing ever been used with the inlet at the bottom.

We discovered that the novel arrangement of pump housing and impeller shown in the drawings and as described above, achieved wholly unexpected results by cavitating and producing a vortex in the vortex chamber 57 which caused air to be drawn into the sump 52 and to be mixed with the oil and water mixture in the oil slick 18 so as to provide an aerated oil-water mixture from which the oil could be more easily separated, as will be described hereinafter.

In the operation of the floating oil skimming apparatus 12, the float members 40 are adjusted so that the upper edges of the outer and inner weirs 26 and 58, respectively, are at the preferred distance below the upper surface of the oil slick 18. In normal operation, the upper edges of the weirs would be close to the bottom of the oil slick, and preferably slightly below the slick so as to skim off all of the oil-water mixture and a very small amount of the water below the slick.

The operation of the pump 62 creates a vacuum in the sump 52 so as to cause the oil slick 18 to flow inwardly of the platform 20 and over the outer weir panels 26, across the upper surface 22, over the inner weir 58, and into the sump 52.

As mentioned hereinabove, the wire screens 46 prevent trash and other debris in the oil slick from floating into the sump.

The position of the top edges of the weirs relative to the upper and lower surfaces of the oil slick limit the flow across the weirs, to the oil slick itself and a very small amount of the water below it, and retards the flow of the major water layer which is below the oil slick 18 and which would place an unnecessary burden on the oil-water separator.

If it is desired to assist the flow of the oil slick 18 onto the floating platform 20, water jets from the nozzles 50 can be employed for that purpose. Where there is considerable movement of the water, as in the ocean, such water jets are unnecessary. However, in a still pond, such jets increase the rate of flow of the slick into the pump.

If it is desired to have the oil slick flow into the skimming apparatus from only one side, solid partitions (not shown) can be used in place of the screens 46 on three sides of the device, and the position of the float members can be adjusted to "tilt" the remaining open end in a downward direction to facilitate the flow of the slick 18 over an outer weir panel 26. This would normally not be employed where there are several such oil skimmers in a large slick, but such an arrangement may be preferred where a skimmer is positioned adjacent the edge of the slick, as in a small pond.

As described above, the unique arrangement of the centrifugal pump 62 with the bottom inlet 67 positioned above the vortex chamber 57, cavitates and causes air to be drawn into the sump 52 and to become intimately mixed with the oil-water mixture in the slick 18. This aerated oil-water mixture is then conveyed through a pipe 74 (FIG. 1) to the top of the oil separator 14.

Figure 1:
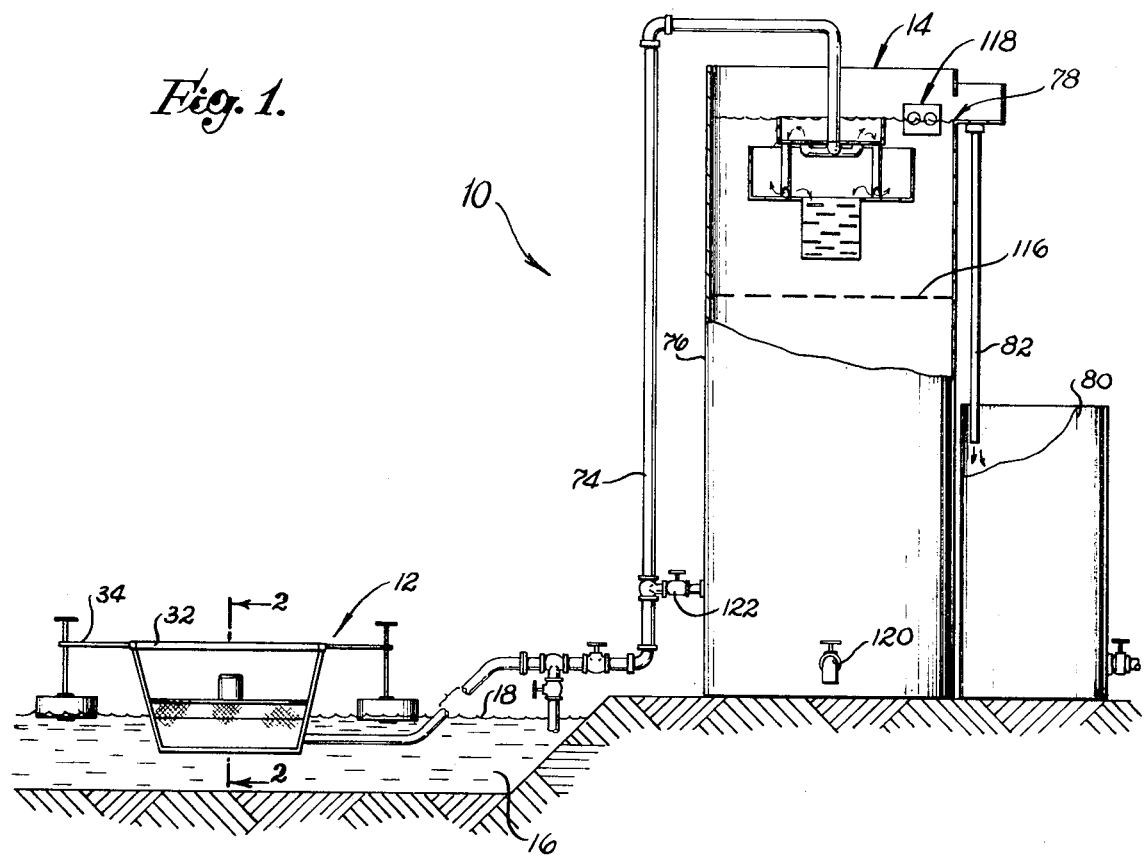
FIG. 1 is a side elevational view, partially in cross-section, of a floating oil skimming apparatus with oil and water separator, embodying the teachings of the present invention.
Figure 5:
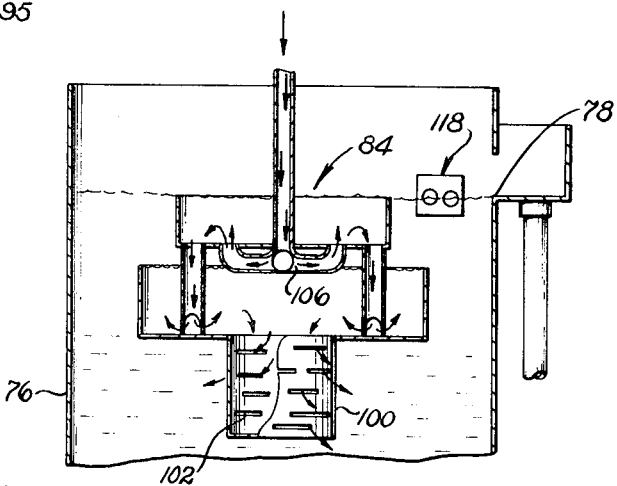
FIG. 5 is an enlarged, fragmentary, vertical sectional view of the upper portion of the oil-separator tank shown in FIG. 1.

Referring to FIGS. 1 and 5, the oil and water separator 14 includes a tank 76 with an oil overflow outlet 78 adjacent the top thereof, the top of the outlet is open to the atmosphere for the escape of the entrapped air and the bottom thereof is in communication with an oil storage container 80 through a drain pipe 82.

Positioned in the upper end of the tank 76 is an oil separator 84 which includes an upper pan 86 with a bottom wall 88 and side walls 90 and upper edges 92, a lower pan 94 with a bottom wall 95 and side walls 96 and upper edges 98, and a cup-like discharge member 100 which contains a plurality of vertically spaced horizontal slots 102 and which is in communication with the lower pan 94 through an opening 104. The upper edges 92 of the upper pan are in substantial horizontal alignment with the oil overflow outlet 78.

Figure 6:
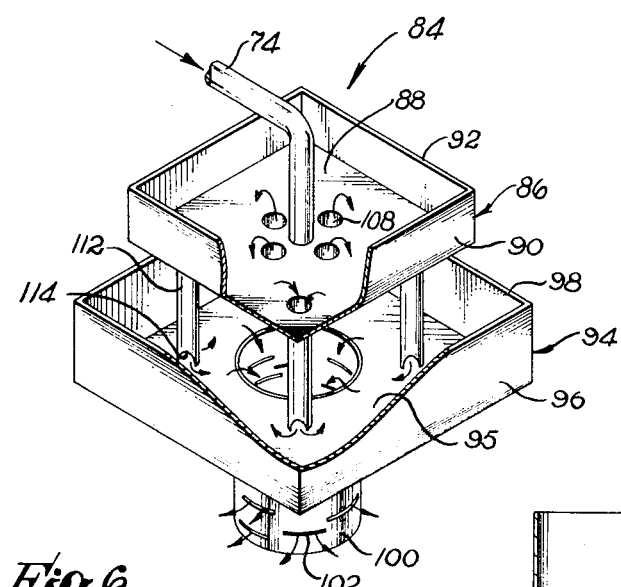
FIG. 6 is an enlarged, perspective view of the double-pan oil and water separator which is contained in the top of the tank shown in FIG. 5.

Referring to FIGS. 5 and 6, the pipe 74 from the oil skimming apparatus 12, passes downwardly through an opening adjacent the center of the bottom wall 88 of the upper pan 86, and into a pipe-spider 106 which terminates in four inner openings 108 in the bottom wall 88. Four outer openings 110 are also contained in the bottom wall, and these are in communication with the bottom pan 94 through four down comer pipes 112 which have openings 114 adjacent their lower ends.

Thus, it will be apparent that as the aerated oil-water mixture flows through the pipe spider 106 and into the upper pan 86, the oil and air float toward the top and into the overflow outlet 78, while water and some oil flow downwardly through the downcomer pipes 112 and into the lower pan 94. Again, oil and air from the lower pan float toward the top of the tank and the water passes through the opening 104, into the discharge member 110, and out through the slots 102.

Although the oil and water separator assembly 84 is relatively efficient, some oil is carried with the water through the discharge member 110 to provide a water and water-oil mixture interface 116 below the lower end of the discharge member 100.

Located adjacent the top of the tank 76 is a float control 118, which is used for controlling the level of the aforementioned interface 116, the control being adjusted to maintain the interface a predetermined distance below the bottom end of the discharge member 100 so as to provide an oil-water pad to receive the aerated oil and water mixture from the pipe 74.

As shown in FIG. 1, a first drain valve 120 is provided adjacent the bottom of the tank 76 for drawing the water therefrom, and a second drain valve 122 interconnects the bottom portion of the tank 76 with a portion of the pipe 74 so that when the pump 62 is not in operation, the water from the tank 76 can be drained directly into the pond 16 or other body of water from which the oil slick is being removed.

Thus, it is apparent that there has been provided a novel floating oil skimming apparatus with an oil and water separator which fulfills all of the objects and advantages sought therefor. The centrifugal pump 62 causes the oil slick 18 to be drawn inwardly over the outer and inner weirs 26 and 58, respectively, whereby the oil slick is "skimmed" from the upper surface of the body of water. The unique arrangement of the inlet of the centrifugal pump, the open impeller and the vortex chamber causes air to be intimately mixed with the oil and water mixture, whereby the separation of the oil from the water is facilitated in the separator where the mixture is caused to flow downwardly through circuitous passageways, whereby the air and oil float to the top of the container and the water flows to the bottom.

We claim as our invention:

1. Apparatus for removing an oil-water mixture from the surface of a body of water and separating the oil from the water, comprising in combination:

a platform with negative buoyancy having a relatively flat, generally horizontal upper surface, with adjustable float means peripherally arranged exteriorly of said platform, whereby said upper surface is located below the surface of a body of water in which the platform is floated;

first weir means arranged around the exterior of said platform and having an upper edge positioned below the surface of said body of water for limiting the flow of an oil-water mixture onto said upper surface;

an upwardly open sump compartment adjacent the center of the platform and having a bottom wall positioned below the upper surface of said platform for receiving the oil-water mixture which flows over the upper edge of the weir means;

pump means including an impeller in a housing supported on said platform and having a pump inlet in communication with the interior of said sump compartment;

said impeller, housing and sump compartment being constructed and arranged for causing air to be drawn into the oil-water mixture in said sump compartment thereby aerating said mixture;

outlet means from said pump for conveying the aerated oil-water mixture to separator means;

a separator tank having an inlet in communication with the pump outlet for receiving the aerated oil-water mixture and having an open top, a side wall and a bottom wall, and a water outlet adjacent the bottom wall;

a plurality of vertically arranged open top compartments with side walls and bottom walls supported in said tank adjacent the top thereof;

fluid inlet means to the interior of said compartments including conduit means in communication with said tank inlet and at least the uppermost compartment of said vertically arranged compartments;

fluid outlet means in the bottom walls of said compartments, whereby there is fluid communication between said compartments and the interior of the tank for water to flow downwardly between compartments and into the interior of the tank through the bottom compartment; and an overflow outlet in the side wall of the tank adjacent the top thereof, whereby oil flowing upwardly through the open tops of said vertically arranged compartments is removed from said tank after the separation thereof from said aerated oil-water mixture.

2. A skimming apparatus for use on a body of water having an upper surface containing a floating oil-water mixture, comprising:

a platform with negative buoyancy having a relatively flat, generally horizontal upper surface, with adjustable float means peripherally arranged exteriorly of said platform, whereby said upper surface is located below the surface of a body of water in which the platform is floated;

first weir means arranged around the exterior of said platform and having an upper edge positioned below the surface of said body of water for limiting the flow of an oil-water mixture onto said upper surface;

an upwardly open sump compartment adjacent the center of the platform and having a bottom wall positioned below the upper surface of said platform for receiving the oil-water mixture which flows over the upper edge of the weir means;

pump means including an impeller in a housing supported on said platform and having a pump inlet in communication with the interior of said sump compartment;

said impeller, housing and sump compartment being constructed and arranged for causing air to be drawn into the oil-water mixture in said sump compartment thereby aerating said mixture; and outlet means from said pump for conveying the aerated oil-water mixture away from said apparatus.

3. A skimming apparatus as described in claim 2 which includes a vertically-extending screen member in engagement with the inner surface of the first weir means and having an upper edge which extends above the weir means and above the surface of the body of water in which the apparatus is floated, whereby trash floating on said surface is prevented from passing over the weir and onto the upper surface of the platform.

4. A skimming apparatus as described in claim 2 which includes second weir means peripherally arranged around the upper edge of said upwardly open sump compartment, the upper edge of the second weir means being in substantial horizontal alignment with the upper edge of the first weir means, whereby a fluid pad for the floating of an oil-water mixture is provided on the upper surface of the platform between said first and second weir means.

5. A skimming apparatus as described in claim 2 in which the pump inlet opens downwardly and is positioned in the sump compartment above the bottom wall thereof, and the impeller includes a rotatable plate with a plurality of curved, radially-extending blades depending therefrom.

6. A skimming apparatus as described in claim 5 in which the impeller contains three, equally spaced blades.

7. A skimming apparatus as described in claim 5 in which:

the sump compartment includes an upper annular pump chamber with a side wall, and a lower annular vortex chamber of reduced diameter with a horizontally extending intermediate wall therebetween; and the pump inlet is positioned within the pump chamber and above said intermediate wall.

8. A separator for separating the oil from an aerated oil-water mixture, comprising:

a tank having an inlet for receiving an aerated oil-water mixture, an open top, a side wall and a bottom wall, and a water outlet adjacent the bottom wall;

a plurality of vertically arranged open top compartments with side walls and bottom walls supported in said tank adjacent the top thereof;

fluid inlet means to the interior of said compartments including conduit means in communication with said tank inlet and at least the uppermost compartment of said vertically arranged compartments;

fluid outlet means in the bottom walls of said compartments, whereby there is fluid communication between said compartments and the interior of the tank for water to flow downwardly between compartments and into the interior of the tank through the bottom compartment; and an overflow outlet in the side wall of the tank adjacent the top thereof, whereby oil flowing upwardly through the open tops of said vertically arranged compartments is removed from said tank after the separation thereof from said aerated oil-water mixture.

9. A separator as described in claim 8 in which:

the vertically arranged compartments include at least an upper pan and a lower pan, each having a bottom wall and an upwardly extending side wall;

the side wall of the lower pan being spaced outwardly of the side wall of the upper pan;

a first set of openings in the bottom wall of the upper pan;

conduits interconnecting said first openings in the bottom wall of the upper pan with the interior of the lower pan; and fluid passage means in the bottom wall of the lower pan in communication with the interior of the tank.

10. A separator as described in claim 9 in which the upper edge of the side wall of the upper pan is in substantial horizontal alignment with said overflow outlet.

11. A separator as described in claim 9 in which the bottom wall of the upper pan contains a second set of openings and the conduit means in communication with the tank inlet interconnects with said second set of openings to cause fluid carried by said conduit means to be directed upwardly into the interior of the upper pan.

12. A separator as described in claim 9 in which the fluid passage means in the bottom wall of the lower pan is centrally arranged and directly communicates with a depending cup-like chamber having a bottom wall and a side wall with a plurality of vertically spaced, horizontal slots in said side wall.

* * * * *